United States Patent Office 3,447,281
Patented June 3, 1969

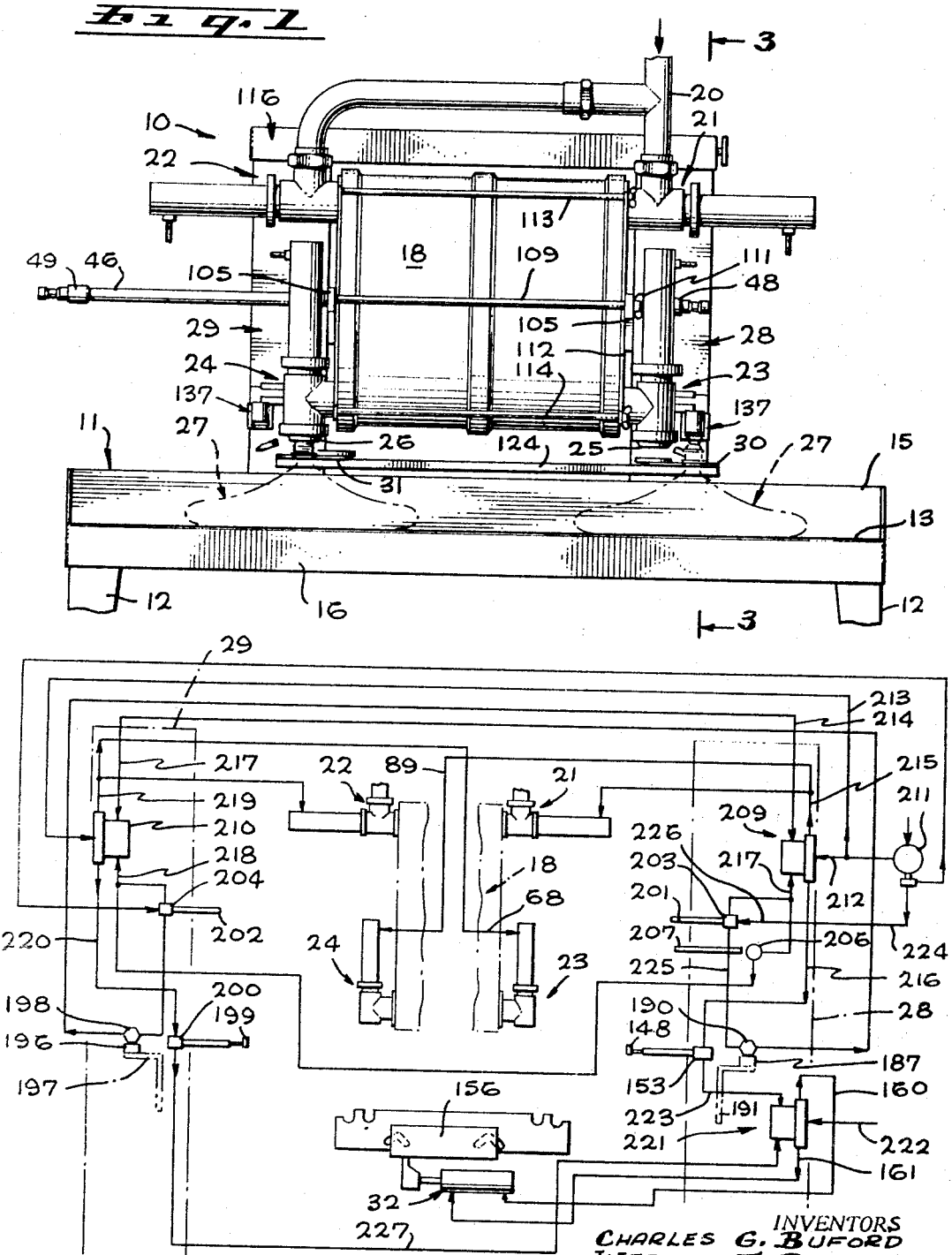

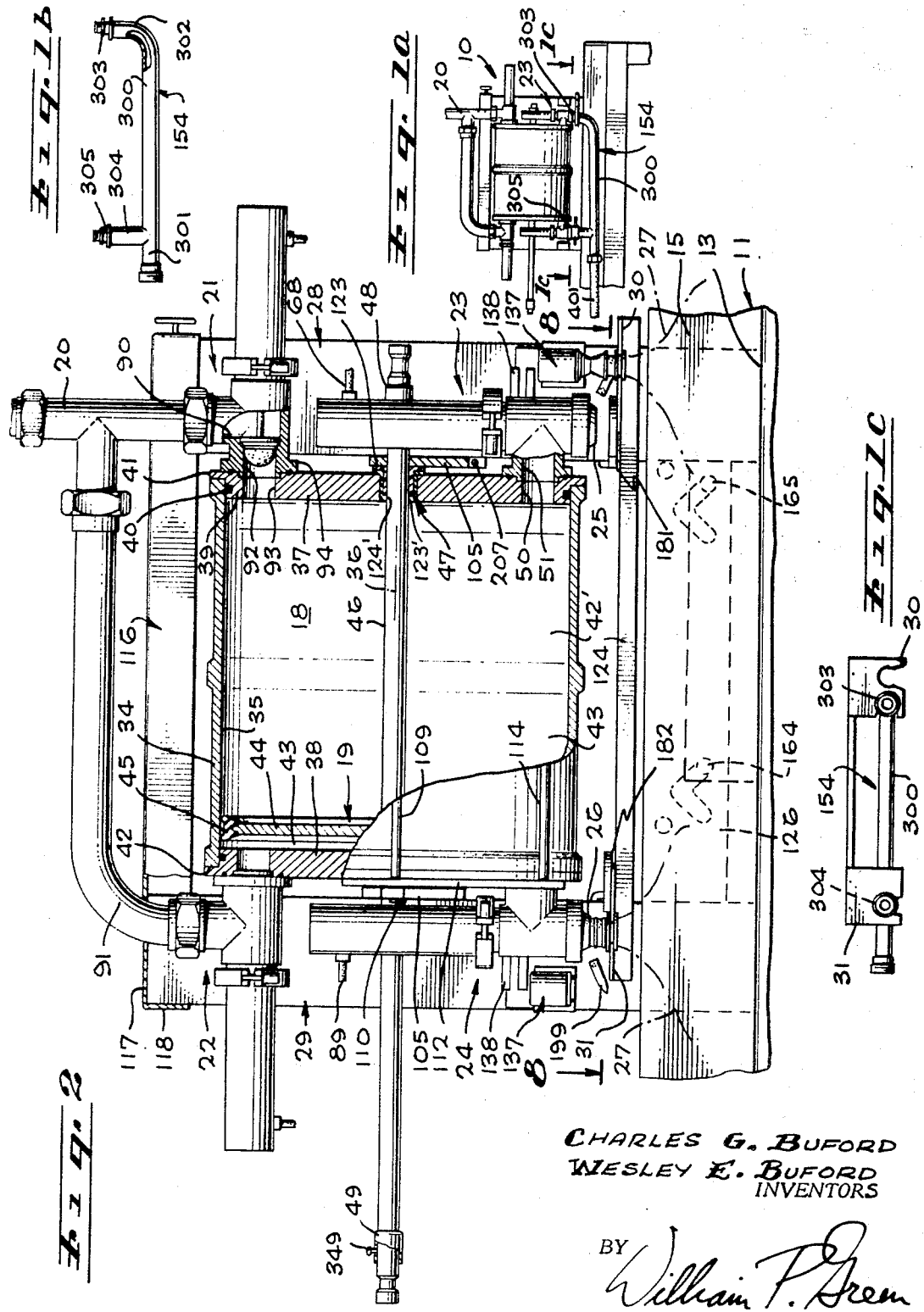

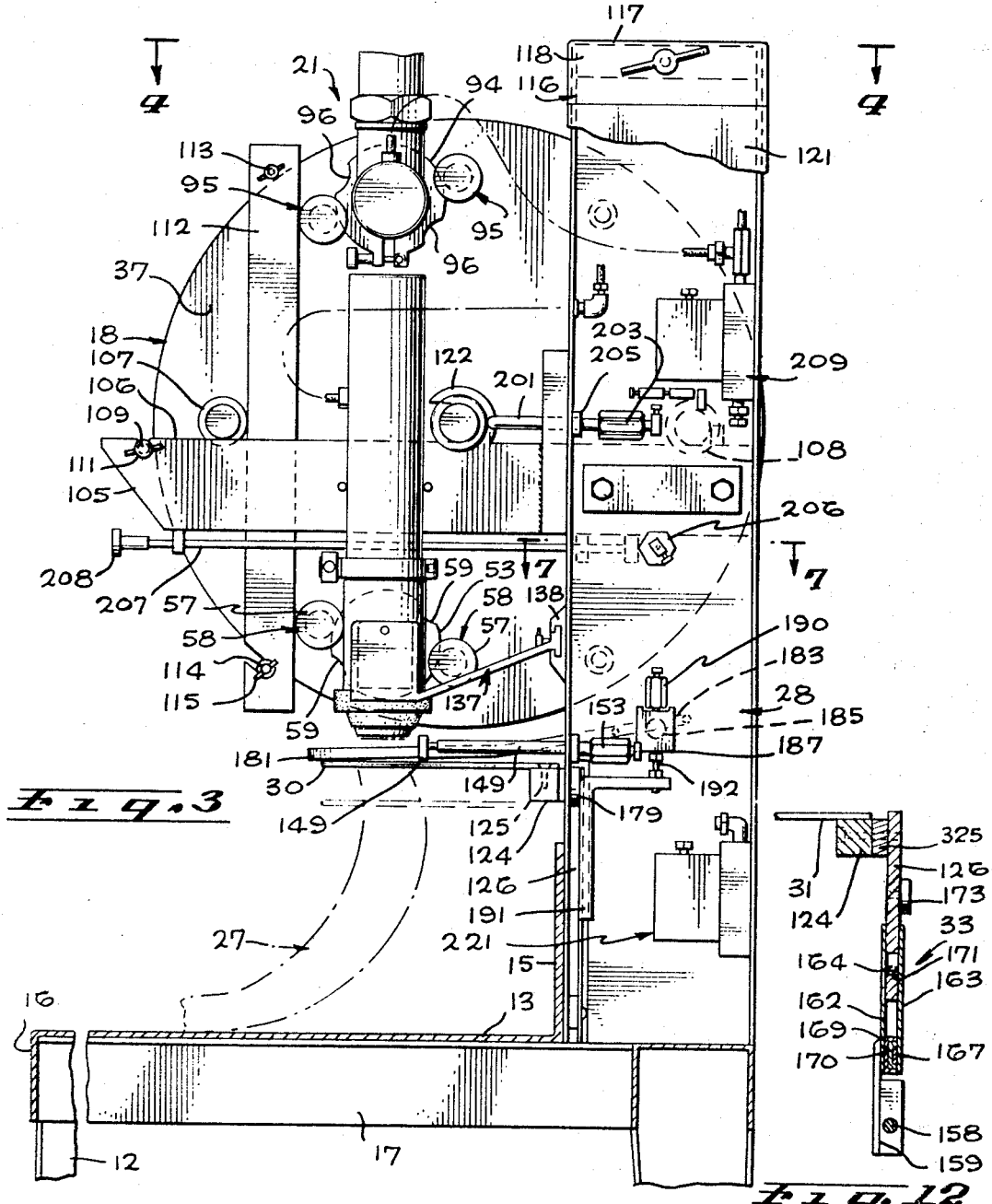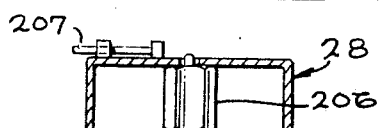

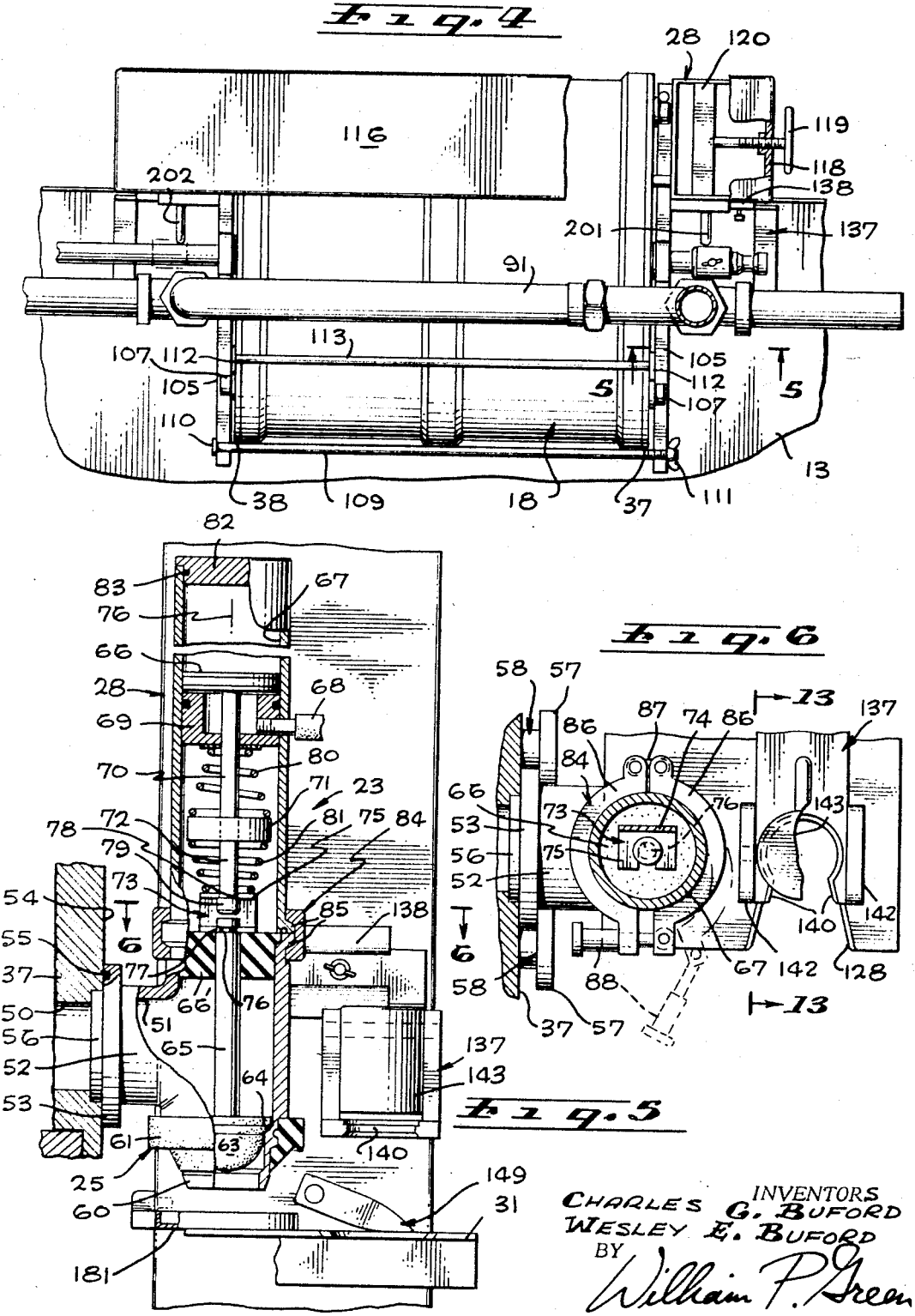

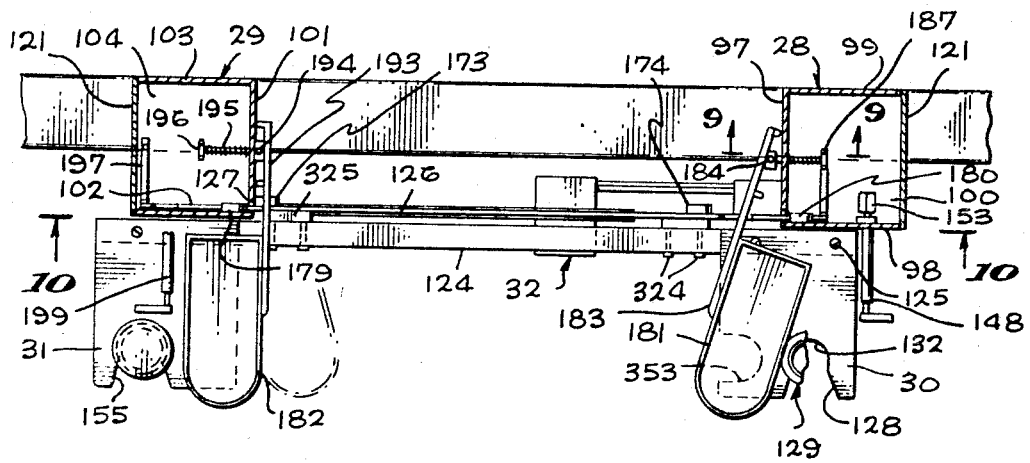
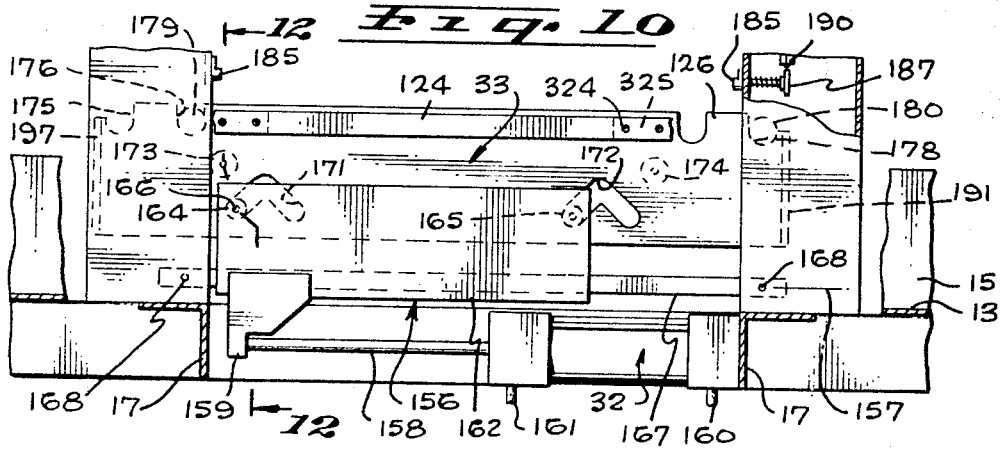
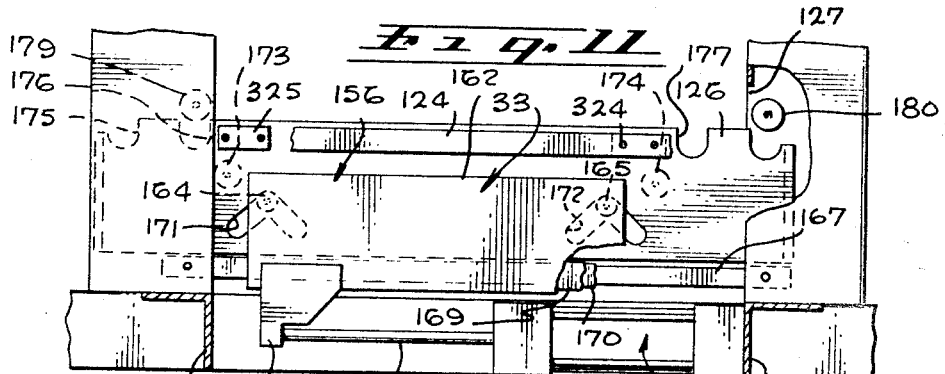

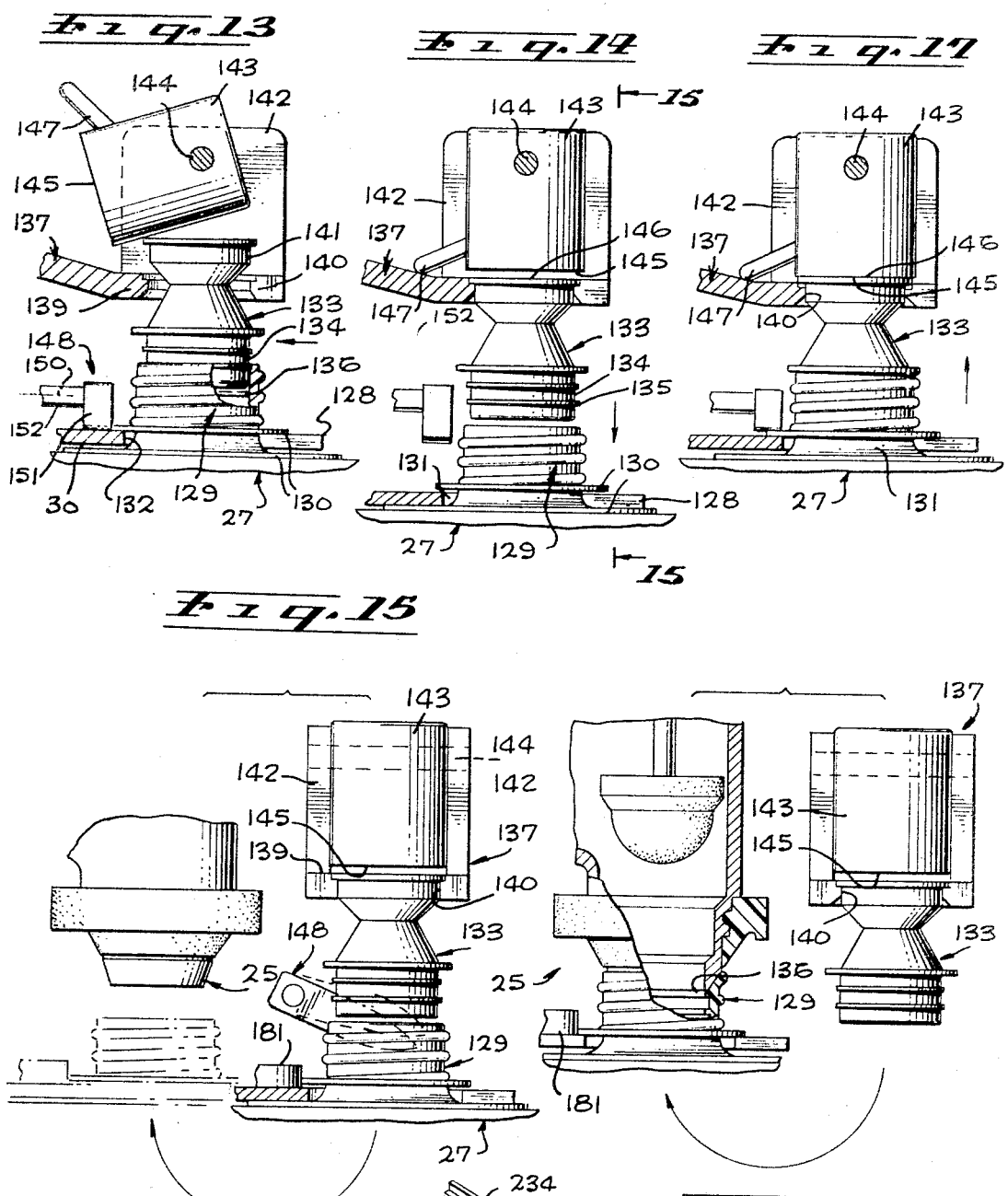

3,447,281
APPARATUS FOR FILLING CONTAINERS
Charles G. Buford, 17727 Laxford Ave., Azusa, Calif.
91702, and Wesley E. Buford, 1045 N. Azusa, Covina,
Calif. 91722
Filed May 19, 1966, Ser. No. 551,458
Int. Cl. B65b 3/12, 7/28, 57/08
U.S. Cl. 53—59    41 Claims

ABSTRACT OF THE DISCLOSURE

A machine for filling liquid into a series of containers, including a cylinder containing a piston which acts upon movement in two opposite directions to fill liquid into containers at two different filling locations. Two holders are provided near each filling location, one for holding and positioning the neck of a container to be filled, and the other for holding a cap or other closure element to close the container. Upon each cycle of operation, the first holder shifts a carried container first from a retracted position to a filling position and then back to the retracted position after filling, for engagement with and closure by a cap retained in the second holder.

---

This invention relates to improved apparatus for dispensing measured quantities of a fluid into a series of containers. Certain features of the invention are especially directed to the filling of a liquid, such as milk or the like, into flexible bags; and the invention will be discussed primarily as applied to the filling of such bags.

A major object of the invention is to provide container filling equipment which is capable of measuring the quantity of fluid filled into each container very accurately, so that a predetermined minimum quantity of fluid in each container may be assured without the necessity for nominally overfilling in order to compensate for the usual wide tolerances encountered in prior equipment.

Further objects of the invention are to provide equipment which is capable of filling a series of bags or the like very rapidly, and preferably in a manner such that as one container is being filled, an operator may be moving the next successive bag or the like into a filling position. For this purpose, there are desirably two locations at which filling occurs, alternately, to enable such movement of a bag to one of these locations while another bag is being filled at the other location.

Desirably, the appparatus is designed to automatically apply a cap or other closure element to each container after it has been filled. This closure element may initially be applied loosely to the container prior to the filling operation, so that the container and its closure element may be moved by an operator to the vicinity of one of the filling locations, following which the apparatus may first remove the closure element from the container, then fill the container, and then reapply the closure element to a more fully installed and completely closed condition. For this purpose, there may be provided a holder element to which the container is applied, with this holder element and a liquid dispensing fitting being mounted for relative movement to bring the container into a proper filling position. A second holder may receive and retain the closure element, so that movement of the first holder and the container relative to the second holder may serve to separate the closure from the bag or other container. Preferably, the first holder and the container are movable first downwardly away from the closure element, then laterally to a position beneath the dispensing fitting, then upwardly for the filling operation, and then in a reverse manner downwardly, laterally, and upwardly to reapply the closure element to the container. All of this motion may be produced automatically by the apparatus, and preferably at the mentioned two different filling locations alternately.

For metering the fluid, I prefer to employ a structure having a chamber with a movable wall, such as a piston, which varies the effective size of the chamber during a dispensing operation to force a measured quantity of fluid into one of the containers. For optimum results, a piston or other relatively movable partition of this type forms two metering compartments at its opposite sides, for dispensing liquid alternately from those two compartments, so that as one is being filled the other can be discharging into a container. Also, the fluid entering one of the compartments can be employed for effecting relative movement between the piston and the surrounding cylinder, to thereby serve as the motive force for discharging fluid from the other compartment. The motion of the previously discussed holders for the container and closure element can be controlled automatically in a predetermined relation with respect to the movement of the piston, to attain an automatic cycle of operation for performing a complete dispensing function. Additional features of the invention relate to the automatic control apparatus and the cam actuating mechanism which may be employed for producing the various operations.

The above and other features and objects of the invention will be better understood from the following detailed description of the typical embodiment illustrated in the accompanying drawings, in which:

FIG. 1 is a front elevational view of a piece of equipment constructed in accordance with the invention;

FIG. 1a shows the apparatus while being rinsed out;

FIG. 1b shows the rinse-out fitting of FIG. 1a;

FIG. 1c is taken on line 1c—1c of FIG. 1a;

FIG. 2 is an enlarged view similar to FIG. 1, but showing the apparatus partially broken away;

FIG. 3 is a further enlarged view taken primarily on line 3—3 of FIG. 1.

FIG. 4 is a plan view taken on line 4—4 of FIG. 3;

FIG. 5 is a greatly enlarged fragmentary vertical section taken on line 5—5 of FIG. 4;

FIG. 6 is a fragmentary horizontal section taken on line 6—6 of FIG. 5;

FIG. 7 is a fragmentary horizontal section taken on line 7—7 of FIG. 3;

FIG. 8 is a horizontal section taken on line 8—8 of FIG. 2, but with the cam and holder mechanism in a different position than in FIG. 2;

FIGS. 9 and 10 are vertical sections taken on lines 9—9 and 10—10 respectively of FIG. 8;

FIG. 11 is a view similar to FIG. 10, but showing the cam mechanism in a different position;

FIG. 12 is a fragmentary vertical section taken on line 12—12 of FIG. 10;

FIG. 13 is an enlarged fragmentary vertical section taken on line 13—13 of FIG. 6, and showing the capper mechanism as it appears just after a bag and carried cap have been moved into position within their holders;

FIG. 14 is a view similar to FIG. 13, but showing the bag as it moves downwardly away from the cap;

FIG. 15 is a fragmentary vertical section taken on line 15—15 of FIG. 14;

FIG. 16 is similar to FIG. 15, but showing the container and cap during an actual filling operation;

FIG. 17 is similar to FIGS. 13 and 14, but showing the manner in which the cap or closure element is finally applied to the container;

FIG. 18 is the control circuit of the machine; and

FIG. 19 shows a variational form of cap holder.

With reference first to FIG. 1, I have illustrated at 10 a bag filling machine constructed in accordance with the invention, which machine may typically be utilized for filling milk or the like into flexible plastic bags of vinyl or polyethylene film or the like. The machine includes a table 11 having legs 12 supporting a table top 13 which, as seen best in FIG. 3, may consist of a horizontally extending rectangular sheet of stainless steel or other material on which the bags 27 are placed during filling. The sheet material of table top 13 may have an upturned flange 15 along its rear edge, and a downturned flange 16 extending along and defining the front of the table. Suitable angle irons or other frame members 17 may be provided at the underside of and rearwardly of table top 13 for interconnecting the legs 12 and supporting the top.

Mounted above table top 13, there is provided a metering and dispensing cylinder designated generally at 18, and containing a horizontally reciprocable piston 19 (FIG. 2). The milk or other liquid to be dispensed is fed into the cylinders from an inlet line 20 (FIGS. 1 and 2), which communicates with the opposite ends of the cylinder through two inlet valve units 21 and 22. The fluid discharges from the cylinder through two outlet valve units 23 and 24 and their discharge spouts 25 and 26 into flexible bags 27 at two different filling locations (FIG. 2). The cylinder 18 is supported in fixed position above the table top 13 by two spaced stationary upstanding support columns 28 and 29 (FIGS. 1 and 2), which as seen in FIG. 3 are rigidly connected to the framework formed by legs 12 and frame members 17. During a filling operation the bags 27 are retained and located by two holders 30 and 31 (FIG. 8), which are shiftable between retracted and filling positions by a piston and cylinder mechanism 32 (FIGS. 8 and 10) through a cam assembly generally designated at 33.

As seen best in FIG. 2, the main metering cylinder 18 has a tubular wall 34, whose inner cylinderical surface 35 is centered about a horizontal axis 36 extending in a left to right direction in FIGS. 1 and 2. The opposite ends of the cylinder are closed by two vertical end walls 37 and 38 of the cylinder, disposed transversely of axis 36, and having portions 39 which project a short distance into the opposite ends of wall 34 of the cylinder and are annularly sealed with respect thereto in fluid tight relation by O-rings 40. Annular flanges 41 on the end walls engage against the annular end surfaces 42 of cylindrical wall 34 to limit the extent to which the end walls may be moved into engagement with wall 34.

The interior of cylinder 18 is divided into two metering compartments 42' and 43 by piston 19, which may consist of a circular rigid disc 44 carrying an annular seal ring 45 at its outer edge, which ring interfits with disc 44 to move therewith, and is slidable along the inner cylindrical surface 35 of cylinder 18 to form a seal therewith. The disc 44 of piston 19 is rigidly connected to an elongated desirably externally cylindrical double ended piston rod 46, which extends along and is movable along horizontal axis 36, and which projects through two central fluid tight bushings 47 mounted in the end walls 37 and 38 of the cylinder, with each bushing being surrounded by a tubular seal element 123' of rubber or the like which annularly engages the shaft at 124' in sealing relation. At its opposite ends, piston rod 46 has two annular enlargements 48 and 49.

During rightward movement of piston 19, as viewed in FIG. 2, liquid is dispensed from compartment 42' at the the right side of the piston through a circular opening 50 formed in end wall 37 in the cylinder, which opening communicates with a passage 51 formed in body 52 of the valve unit 23 (see FIG. 5). Body 52 has a flange 53 which bears against outer surface 54 of wall 37, and which may carry a rubber O-ring or other seal element 55 contained within a groove in flange 53 for engaging and forming a fluid tight seal with surface 54. A short tubular projecting portion 56 of body 52 may extend into a counterbore formed in end wall 37, as shown. As seen best in FIG. 6, body 52 may be detchably secured to end wall 37 by confinement of flange 53 between wall 37 and the circular enlarged heads 57 of two spaced cylindrical reduced diameter lugs or pins 58 projecting outwardly from, and rigidly connected to, wall 37. Flange 53 may have two arcuately cut away recesses or notches 59 formed at diametrically opposite points along its periphery (FIG. 3), and dimensioned to receive heads 57 of pins 58 in a manner enabling valve body 52, during assembly of the apparatus, to be moved leftwardly toward wall 37 (as viewed in FIGS. 2 and 5), and past heads 57 of the two pins, to a position in which the flange may then be turned to move notches 59 out of axial alignment with heads 57, and thus lock the valve body rigidly in assembled relation with respect to wall 37 of the cylinder. Seal ring 55 may be comressed slightly by this installation of body 52, in a manner assuring maintenance of an effective seal between valve body 52 and end wall 37.

Body 52 forms at its lower end (FIG. 5) the previously mentioned downwardly projecting spout 25, whose outer annular surface 60 may taper as shown, and which spout may carry a rubber seal ring 61 above surface 60, so that either surface 60 or the tapered outer surface of ring 61 may contact a filling neck 129 of one of the bags 14 annularly during a filling operation.

The delivery of fluid through body 52 (FIG. 5) is controlled by a circular valve element 63, which engages downwardly against an annular valve seat 64 formed in body 52, and is actuable upwardly and downwardly by a connected valve stem 65 which passes upwardly through an annular stationary seal ring 66' of rubber or the like. Stem 65 is in turn connected to a pneumatically operated actuating piston 66, contained within a cylinder 67 to which actuating air is fed through a line 68, which connects into a cup shaped member 69 rigidly held in fixed position within cylinder 67 to define a bottom wall of the inner cylinder chamber. Piston 66 rigidly carries a downwardly projecting piston rod or shaft 70, whose lower portion 72 is detachably connected to stem 65 by a U-shaped connector clip 73. This clip 73 may be formed of sheet metal forming an axially extending portion 74 carrying two parallel portions 75 disposed transversely of the vertical axis 76 of the piston and valve and adapted to interfit with the elements 65 and 70 in a manner transmitting vertical forces therebetween. More particularly, one of the portions 75 contains a notch 76 dimensioned to interfit with an annular groove 77 formed in valve stem 65, while the other portion 75 of the clip has a similar notch 78 for embracing lower portion 72 of piston rod 70 and bearing downwardly against enlargement 79 of the piston rod. Two flaring springs 80 and 81 yieldingly urge the piston 66 and valve 63 downwardly to the FIG. 5 closed valve position, but with forces typically being transmitted between these two springs through a floating ring 71 disposed about and movable axially along piston rod 70.

The cylinder 67 of the valve unit or assembly 23 is of straight cylindrical configuration, centered about vertical axis 76, and is closed at its upper end by a top wall 82 suitably sealed at 83 and appropriately rigidly connected to the cylinder wall. The lower end of cylinder 67 is detachably connected to the upper annular portion of valve body 52 by an essentially annular detachable clamp 84, which grips two annular engaging end flanges 85 on parts 52 and 67, and whose two halves 86 are pivotally connected together at 87, and are separately connected together and tightenable about the retained parts by threaded locking member 88. When clamp 84 is removed, the U-shaped clip 73 may be slipped horizontally out of groove 77 in valve stem 65, to thereby completely detach body 52 and its carried parts from cylinder 67 and its contained parts for cleaning. As will be apparent, when compressed air is fed into the interior of element 69 beneath piston 66, the air pressure moves the piston and the connected valve element 63 upwardly, to allow the discharge of milk or other fluid from compartment 42 of FIG. 2 through spout 60 of FIG. 5.

The valve assembly 24 at the left end of cylinder 18 in FIG. 2 may be identical with the above discussed valve assembly 23 at the right end of that cylinder, and may be connnected to end wall 38, in communication with compartment 43 at the left side of piston 19, in the same manner that valve assembly 23 is connected into the right hand end wall 37. Valve assembly 23 may have the same pneumatically operated actuating mechanism discussed in connection with valve assembly 23, and may discharge liquid when open through a delivery spout 26 identical with the previously discussed spout 25. Actuating air is fed to valve assembly 24 through a control line 89.

The two inlet valve assemblies 21 and 22 may also be substantially identical with the specifically described and discussed valve assembly 23, except that the inlet passage 90 of each of these valve assemblies (corresponding to inlet passage 51 of FIG. 5) communicates with a liquid inlet line 91 (with these two lines forming branches of the main liquid inlet line 20), and the outlet passages 92 of valve assemblies 21 and 22 communicate with inlet openings 93 formed in the upper portions of cylinder end walls 37 and 38. About their passages 92, the valve assemblies have flanges 94 which are sealed with respect to the end walls 37 and 38, and are retained against the end walls, in the same manner as are flanges 53 of FIG. 5. That is, each of these flanges is retained against the associated end wall of the main cylinder by a pair of headed retaining pins 95 (FIG. 3) which pass through notches 96 in flanges 94 during assembly.

The two upstanding support columns 28 and 29 of FIGS. 1 and 2 may be formed of sheet material deformed to the U-shaped horizontal cross section illustrated in FIG. 8. That is, support column 28 may have an inner vertical wall 97 and two parallel vertical front and rear walls 98 and 99, with the outer side of the column typically being closed by a cover plate 121, which is removable for access to the interior 100 of the column. Similarly, column 29 may have an inner wall 101 which is parallel to wall 97 of column 28, and have two parallel front and rear walls 102 and 103, with the interior 104 of column 29 being accessible through another cover plate 121. For supporting cylinder 18 from these columns, the two inner walls 97 and 101 of the two columns may rigidly carry two parallel forwardly projecting rigid members 105 having the outline configuration illustrated in FIG. 3, to present an upper horizontal edge 106 on which piston rod 46 is slidably supported. Also supported on this upper edge 106 of each of the members 102 are two externally cylindrical lugs or pins 107 and 108 which project axially outwardly from and are rigidly carried by the associated end wall 37 or 38 of cylinder 18, to thus further support the end walls of the cylinder from members 105. The outer ends of the two members 105 are tightenable together by means of a rod 109, which is received within notches in members 105, and has a head 110 bearing against the outer side of one of the members 105, and a wing nut 111 adjustably bearing against the other member 105. Confined between each of the members 105 and the associated end wall 37 or 38 of cylinder 18 is a vertical rigid member 112 (FIG. 3), with the upper ends of these two members being rigidly secured together in fixed spaced relation by a second axial rod 113, and with the lower ends of members 112 being adjustably tightenable together by means of a third rod 114 and a connected wing nut 115. Thus, tightening of wing nut 115 will coact with tightening of wing nut 111 of FIG. 4 to assure positive retention of the end walls of the main cylinder 18 against separation from the rest of the cylinder. As seen clearly in FIG. 3, each of the vertical members 112 is confined between the associated lug or pin 107 and two of the pins 58 and 95, in a manner locating members 112 relative to the end walls. To further assist in retaining the end walls on the cylinder, the upper ends of the two columns 28 and 29 may be tightenable together by means of an upper hollow sheet metal cover member 116 (FIGS. 1 and 2), having a top wall 117 and depending peripheral flanges 118 adapted to fit about the ends and the front and rear sides of columns 28 and 29. One of the ends of cover 116 may threadedly and adjustably carry a screw element 119 (FIG. 4), which is tightenable against a member 120 carried by one of the columns, in a manner tightening the columns together to coact with the other elements in securing the end walls 37 and 38 on the main cylinder. Also, the outer sides of the two columns may if desired be closed by appropriate removable walls one of which is typically represented at 121 in FIG. 3. To further assist in locating the cylinder relative to the support structure, each of the members 105 may have a forwardly opening hook portion 122 (FIG. 3), which extends upwardly above upper edge 106 of member 105 and about the piston rod in locating relation. This hook portion of member 105, and the immediately adjacent portion beneath edge 106 of that member, also serve the purpose of bearing laterally or axially inwardly against an outer flange 123 of bushing 47 to hold that bushing and its seal element 123' within the end wall 37 or 38 (FIG. 2), and to annularly clamp the end flange of the seal element between flange 123 and wall 37 or 38 in fluid tight relation.

During a filling operation, the necks of the flexible bags are held and located by the two holders designated 30 and 31 in FIG. 8. Each of these holders may take the form of a rigid horizontal plate formed of sheet material or the like projecting forwardly to a location beneath one of the delivery spouts 25 or 26. The two holders 30 and 31 are connected at their rear edges to a common horizontally elongated rigid carrier member 124 (FIGS. 3 and 8), with the connection between member 124 and holders 30 and 31 typically being formed by screws 125. Member 124 is in turn rigidly connected to and actuated by a vertically extending essentially planar carrier plate 126 which is mounted to slide horizontally and move vertically with its carried parts, and whose opposite ends project slidably through vertical slots 127 (FIG. 8) in column walls 97 and 101 into the interior of columns 28 and 29. The connection between member 124 and plate 126 may be made by a number of screws 324 (FIGS. 8 and 10) with these parts being spaced apart by blocks 325 so that member 124 may be received in front of columns 28 and 29 while plate 126 is within the columns and rearwardly of their walls 98 and 102.

Holder 30 has formed in its forward edge portion a rearwardly narrowing notch or throat 128 (FIGS. 6, 8 and 13), for receiving and holding the upper neck portion 129 of one of the bags 27. This neck portion 129 (FIG. 13) may be formed of a more rigid though still somewhat flexible plastic material than is the very flexible body of bag 14, with the neck portion 129 being tubular and extending vertically as shown, and having two annular flanges 130 forming between them an annular groove 131 within which the inner edge 132 of holder 30 is received in confined relation. In this connection, it is noted that throat 128 is so formed (FIG. 8) as to provide a circular or arcuate edge 132 extending far enough about neck 129 of the bag (desirably about 180 degrees) to properly support it and locate it during filling.

At the time that the various bags 27 are delivered to the location of the present machine for filling, each of the bags already carries a closure element 133, taking the form of a cap having a lower portion 134 (FIG. 14) adapted to project downwardly into and ultimately be tightly retained within the tubular filling neck 129 of the bag. Portion 134 of the cap may have peripheral ribs 135 which snap downwardly past one or more internal ribs 136 in neck 129 to ultimately retain the cap in the fully applied position of FIG. 17. The initial position of the cap, at the time of delivery of the bag to the machines, is illustrated in FIG. 13, in which the cap is held frictionally but more loosely than in FIG. 17, and is relatively easily separable from the neck 129.

To receive and hold cap 133, there is provided above holder 30 a second holder 137 (FIGS. 3 and 13), which may take the form of a rigid metal member removably mounted by a bracket 138 to the forward side of column 28, and which has at its forward end a horizontally extending portion 139 containing a rearwardly narrowing throat 140 (FIG. 6) which is vertically aligned with and faces the same direction as throat 128 of holder 30, so that as the bag neck 129 and the loosely carried cap 133 are moved rearwardly, cap 133 may move into throat 140 as the neck moves into interfitting relation with throat 128. The rear end of throat 140 terminates in an essentially semicircular portion (preferably slightly over 180 degrees) which is smaller in diameter than upper enlargement 141 of cap 133 (FIG. 13), and which is dimensioned to receive and locate the cap in the relation illustrated in FIG. 14 after the bag has been moved downwardly to the FIG. 14 position.

Projecting upwardly from opposite sides of horizontal portion 139 of holder 137, this holder has two upwardly projecting parallel portions 142, between which there is mounted an externally cylindrical capper member 143 which is supported for pivotal movement between the positions of FIGS. 13 and 14 by a pin 144 extending through member 143 and the side portions 142 of the holder. The surface 145 of member 143 which faces downwardly in the FIG. 14 normal position of that member is planar and extends horizontally in that position, to engage and apply resistive force to the upper planar surface 146 of cap or closure element 133. A pin 147 may project rearwardly and downwardly from member 143 to limit the forward swinging movement of that member in the FIG. 14 position. During initial movement of the loosely carried cap 133 into holder 137, this cap projects upwardly far enough to deflect member 143 rearwardly and pivotally to the FIG. 13 position.

One of the automatic controls for the apparatus is provided by deflection of a sensing element 148 rearwardly between the broken line and full line positions of FIG. 13 in response to movement of a bag and carried cap into interfitting relation with the two holders 30 and 137. This sensing element 148 projects forwardly within a mounting tube 149 (FIG. 3), by which the sensing element is mounted for spring resisted front to rear sliding movement along an axis 150, so that when the bag engaging arm 151 carried at the forward end of the sensing element is deflected rearwardly, the horizontal shaft 152 of that element serves to actuate a control valve or air "switch" 153 for commencing a predetermined shifting movement of holder 30. Shaft 152 and arm 151 are also free for limited pivotal movement about axis 150 between the normal full line position of FIG. 15 and the upwardly deflected broken line position.

Holder 30 may contain, at a location laterally offset from its throat 128, a notch 353 (FIG. 8) for receiving and locating a fitting 154 (FIG. 1a) to be utilized in rinsing out the main cylinder. The holder 31 at the second end of the cylinder may be essentially the same as holder 30 except that throat 155 corresponding to throat 128 is located near the left side rather than the right side of the holder, and also in holder 31 there is no notch or recess corresponding to that shown at 353 in holder 30.

The cam mechanism designated generally 33 in FIGS. 10 and 11 acts to shift the two holders 30 and 31 simultaneously in a manner such that as one of the holders moves from its active filling position to a laterally retracted position, the other holder moves from its retracted position to its filling position. During each such shifting movement, holders 30 and 31 and their connected parts are first shifted downwardly, then horizontally, and then upwardly. For this purpose, cam mechanism 33 includes an actuating member 156 which is mounted for only horizontal movement along a left to right axis 157 as viewed in FIG. 10, and which is shifted in that direction by the piston of a piston and cylinder mechanism 32, which piston is connected by its rod 158 to a bracket member 159 rigidly secured to member 156. The piston is pneumatically actuable to the left in FIG. 10 by the introduction of air under pressure to the cylinder through a line 160, and is returnable to the right by the introduction of air into a second line 161. Member 156 may be formed of a pair of vertically extending parallel plates 162 and 163 (FIG. 12), between which the previously mentioned plate 126 is slidably received and confined. Between plates 162 and 163, there are rotatably mounted two cam rollers 164 and 165, which are rotatably mounted about shafts 166 which are connected at their opposite ends to and serve to rigidly interconnect the two plates 162 and 163. Near the lower edges of plates 162 and 163, these plates are guided for only horizontal sliding movement by a stationary guide bar 167 (FIGS. 10 and 12), which is rigidly secured at its opposite ends to columns 28 and 29 at 168. Plate 163 rigidly carries a channel member 169, which contains a channel bushing 170 formed of bronze spring metal or the like, with member 167 being confined within that bushing member in relatively slidable relation.

The two cam rollers 164 and 165 are movably received within two inverted V-shaped identical cam slots or guide ways 171 and 172 formed in member 126, and each having a width corresponding substantially to the diameter of the received roller, to thus cam member 126 upwardly and downwardly in correspondence with horizontal movement of member 156. In addition to its vertical movement, member 126 is free for limited horizontal movement, which is limited in one direction by engagement of a first roller 173 (FIG. 10) on member 126 with wall 101 of column 29, and which horizontal movement is limited in the opposite direction by engagement of a second roller 174 with inner wall 97 of column 28. These two rollers are rotatably mounted to member 126, to turn about horizontal axes, and may thus roll upwardly and downwardly along the engaged walls 101 and 97 upon contact therewith. Also, member 126 has at its upper edge four locating notches 175, 176, 177 and 178 located as illustrated in FIGS. 10 and 11, and positioned to receive two rollers 179 and 180 in locating relation upon upward movement of member 126 relative to columns 28 and 29. The two rollers 179 and 180 are mounted rotatably to the inner sides of vertical walls 102 and 98 respectively of columns 29 and 28 respectively, and both turn about horizontal axes.

On the upper side of each of the holders 30 and 31, at a location offset laterally inwardly from its bag retaining throat 128 or 155, there is supported on the upper surface of the holder a drip pan or tray 181 or 182, which is received beneath the corresponding filling spout 25 or 26, at all times except when a bag is actually being filled, to thus catch any liquid which may drip from the spout. The tray 181 (FIG. 8) is mounted movably by an arm 183 which projects rearwardly to a location along side wall 97 of columns 28, and is pivotally connected at 184 (for relative pivotal movement about a vertical axis) to an enlargement 185 (FIG. 9) formed on the end of a horizontal shaft 186 which carries a vertically displaceable switch actuator 187. Rod 186 is located by extension through an opening 188 in verticall wall 97 of column 28, and is loose enough whithin that opening to enable slight upward and downward movement of element 187. Tray 181 is also able to swing upwardly and downwardly about the axis of rod 186 in correspondence with the vertical movements of holder 30, so that the tray always rests by gravity on the holder.

Rod 186 and the carried parts are normally urged rightwardly as viewed in FIG. 9 to the broken line position of that figure by a coil spring 189. Upon leftward movement of holder 30 from the position of FIG. 6 to the position of FIG. 8, neck 129 of a carried bag engages tray 181 and deflects it laterally to the full line position of FIG. 8, and from a position corresponding to the full line position of tray 182 in FIG. 8, to move element 187 into a position directly beneath an automatic control valve or air "switch" 190, so that upward movement of element 187 will actuate this switch 190. For displacing element 187 upwardly, member 126 rigidly carries a right angle member 191 (FIG. 3), and which adjustably carries an actuating screw 192 adapted upon upward movement to displace element 187 upwardly, and to thus actuate switch 190. When member 126 is in its rightward position of FIG. 2, angle member 191 is out of alignment with switch 190.

Tray 182 at the left side of the apparatus (FIG. 8) is mounted in substantially the same manner as tray 181, but reversely, to pivot laterally between the full line and broken line positions of FIG. 8. More particularly, mounting arm 193 of tray 182 is pivotally connected at 194 to a rod which is spring urged by spring 195, and which carries an element 196 corresponding to element 187 of FIG. 9, and adapted to be actuated by a second angle member 197 carried by member 126 and corresponding to member 191 of FIG. 3. Upward movement of element 196 by angle member 197 actuates another control valve 198 (FIG. 18). The apparatus at the left side of the main cylinder 18 also includes a second sensing element 199 corresponding to element 148 at the right side of the apparatus, for responding to the movement of a cap into retained position at the left filling station. Rearward deflection of this element 199 actuates an air "switch" 200 (FIG. 18).

For automatically halting the filling operation when the piston reaches the opposite ends of its horizontal travel, there are provided at the opposite ends of the cylinder two push rods 201 and 202 which actuate air switches 203 and 204 respectively (FIG. 18) upon engagement of enlargements 48 and 49 on the main piston rod 46 with the push rods (FIG. 4). FIG. 3 shows the manner in which these push rods are mounted within appropriate guide ways represented at 205 and mounted to the columns 28 and 29 respectively, and with switches 203 and 204 being appropriately supported within the two columns. Another control switch 206 may be mounted within the right hand column 28, and be actuable by a push rod 207 which is manually operable from the front of the machine by a push button 208, to function as a panic button for stopping the machine in an emergency.

In addition to the previously described automatic control apparatus, the two columns 28 and 29 also contain two main pilot type valves 209 and 210. Valve 209 receives air under a predetermined pressure from a regulator 211 (FIG. 18) through a line 212, while valve 210 receives corresponding regulated air through a communicating line 213. When a pneumatic control signal is applied to valve 209 through an input line 214, this causes the valve to automatically pass air from line 212 into a line 215 leading to valves 21 and 24, while venting a second line 216 to atmosphere. When the condition of valve 209 is reversed by the admission of a pneumatic signal to the second input line 217 of valve 209, this admits air from line 212 to line 216, and vents line 215 to atmosphere. The second pilot type valve 210 operates in the same manner in response to the application of input signals to two input lines 217 and 218 to admit air from line 213 selectively to either a line 219 leading to valves 22 and 23, or a line 220 (with the unpressurized line in each condition of course being vented to atmosphere). Another pilot valve 221 functions in the same manner as valves 209 and 210, to automatically control the admission of actuating air from an input line 222 to the opposite ends of piston and cylinder mechanism 32. Whenever any one of the valves 209, 210 or 221 is actuated to one of its two conditions by a control signal, it remains in that condition until a reversing signal is received and even though the original pneumatic signal is terminated.

To now describe a cycle of operation of the equipment illustrated in the drawings, assume first of all that the apparatus is initially in the condition illustrated in FIGS. 1 through 6, with piston 19 in its leftmost position, and with the holders 30 and 31 and their connected parts in their rightmost position. When the parts are in this condition, the throat 128 of holder 30 is in vertical alignment with throat 140 of holder 137, as indicated in FIGS. 5, 6 and 13. As an operator moves the neck 129 of flexible bag 14, and a loosely carried cap 133, rearwardly (leftwardly in FIG. 13), neck 129 slides into retained relation within throat 128, and the cap 133 moves into a correspondingly retailed relation within throat 140, with element 143 being deflected to the FIG. 13 position by such movement of the cap into throat 140. During the final portion of this rearward movement of the bag, the upper one of the two flanges 130 on the bag acts to engage arm 151 of sensing element 148 near its extremity and deflect element 148 rearwardly in a manner actuating valve 153 of the FIG. 18 control circuit to an open condition. Since valve 209 is already in a condition in which pressurized air is admitted from input line 212 to line 216 (but not line 215), the opening of valve 153 acts to admit air to the upper control line 223 of valve 221, to thus admit air from input line 222 through line 160 to the right end of piston and cylinder mechanism 32, to thus cause that piston and cylinder mechanism to actuate member 156 leftwardly from the position of FIG. 2 to the position of FIG. 10. During the initial portion of this leftward movement, rollers 164 and 165 merely ride upwardly within cam slots 171 and 172, until they reach the apices of those slots as indicated in FIG. 11. This initial movement of the rollers within the first portions of the slots 171 and 172 thus acts to cam member 126 and its carried holders 30 and 31 downwardly, to move the neck 129 of bag 14 downwardly away from cap 133 as indicated in FIG. 14 (simultaneously moving bag flange 130 away from engagement with arm 151 and thereby allowing element 148 to be spring returned rightwardly to its unactuated condition as shown). During the downward shifting movement of holders 30 and 31 and the connected bag necks, leftward movement of the member 126 and its carried parts (leftward as viewed in FIGS. 10 and 11) is prevented by reception of the rollers 179 and 180 of FIG. 10 within the two locating notches 176 and 178 of member 126. Also, the initial downward movement of the holders 30 and 31 acts to move the neck of the left hand bag in FIG. 2 downwardly away from its filling contact with the left hand filling spout 26 of that figure.

As soon as the cam rollers 164 and 165 reach the apices of cam slots 171 and 172, and rollers 179 and 180 are thus no longer received within their locating notches 176 and 178, the member 126 is then free to move leftwardly with member 156 to the FIG. 11 position, in which such leftward movement of member 126 is halted by engagement of roller 173 with inner wall 101 of column 29. This horizontal movement of member 126 and its carried holders 30 and 31 shifts the holder 30 from the full line position of FIG. 15 laterally to the broken line position of that figure in which the neck of the bag is directly beneath filling spout 25. As the leftward movement of member 156 continues to the final position of FIG. 10, from the position of FIG. 11, rollers 164 and 165 advance downwardly within the second branches of cam slots 171 and 172, to thus shift cam member 126 upwardly to its FIG. 10 position in which it is located against hoirzontal movement by reception of rollers 179 and 180 within notches 176 and 178. This upward movement of holder 30 moves neck 129 of the bag into the FIG. 16 annularly sealed engagement with spout 25, for filling of the bag.

As holder 30 and the carried neck move leftwardly, the neck 129 engages drip pan 181 and deflects it laterally from an initial position directly beneath spout 25 to the full line position of FIG. 8, to thus move element 187 to its FIG. 9 position directly beneath air switch 190. Also, the leftward shifting movement of member 126 moves angle member 191 of FIG. 3 to its FIG. 9 position directly beneath element 187, so that upon the final upward movement of member 126 and the carried angle member 191, the latter acts to displace element 187 upwardly in a manner actuating switch 190 to its open condition.

Such opening of switch 190 in the circuit of FIG. 18 completes a pilot circuit from regulator 211 through a line 224 leading to the previously opened valve 203, and thence through a line 225 and valve 190 into line 217 of valve 210. This pneumatic signal from line 217 actuates valve 210 to a condition for admitting air from line 213 into line 219 leading to the liquid inlet valve 22 of the main cylinder, and the liquid discharge valve 23 of the main cylinder. Thus, valve 22 automatically admits liquid to the left end of cylinder 18, while valve 23 discharges liquid from the opposite end of the cylinder and into the bag which has been moved into filling engagement with spout 25. If no bag were present in holder 30 when the holder is moved to the left, the drip pan would not be deflected leftwardly to its FIG. 8 position, and consequently the element 187 of FIG. 9 would not be in a position to cause actuation of valve 190 and thus commence the filling operation. It is also noted that the valve 203 which has been described above as being previously opened, is in its open condition because the piston was initially assumed to be in its leftward position in which its enlargement 48 retains push rod 201 in the open valve condition as indicated in FIG. 4. When valve 203 is open, air is admitted from line 224 into line 225 as mentioned, and also from line 224 into a line 226 leading through line 217 into valve 209, so that line 212 is initially in communication with line 216 and not line 215, as mentioned.

As the piston 19 moves rightwardly as indicated in broken lines in FIG. 2, the operator removes the capped bag from the left side of the apparatus, and places another bag in position at that left end of the cylinder in the manner discussed in connection with the placement of the initial bag at the right end of the apparatus. Thus, the deflector element 119 of FIG. 18 opens valve 200, in preparation for the next cam shifting operation. When the piston reaches the right end of its travel, the enlargement 49 at the left end of the piston rod opens valve 204 to precondition it for the next cycle of operation, and by such opening of valve 204 to also admit a pneumatic signal through line 218 to the underside of valve 210, to thus automatically close off the air to valves 22 and 23, and thereby halt the filling operation in a manner accurately metering a predetermined quantity of fluid into the bag. This switching of valve 210 to its second condition, in addition to closing line 219, also opens line 220 so that air may pass through that line and valve 200 to pilot type valve 221 through line 227, in a manner reversing the condition of valve 221 and admitting air to the left end of that cylinder through line 161, so that member 156 is shifted rightwardly. If the operator is not able to complete placement of the bag before completion of the filling stroke, then the actuation of valve 210 does not serve to trigger the shifting operation, but merely conditions the apparatus for triggering of the shifting apparatus by the opening of valve 200. In any event, the apparatus will shift as soon as the main piston has completed its filling motion and an operator has the next successive bag in position.

During the rightward shifting movement of member 156, the cam rollers 164 and 165 first move upwardly within their cam slots, then move members 126 and 156 in unison until roller 174 engages the right hand column, and then move downwardly within the cam slots, to shift the holders downwardly, laterally and upwardly This first moves neck 129 downwardly from its FIG. 16 position to a position out of contact with spout 25, following which the holder 30 and carried neck 129 move laterally to a position beneath holder 137, so that upon the final upward movement of holder 30 in vertical alignment with holder 137, the neck 129 moves into engagement with the lower portion 134 of cap 133 as indicated in FIG. 17, and is pressed upward against the cap, with upward movement of the cap being resisted by engagement of the cap with under surface 145 of element 143, so that the cap is tightly pressed into full closing engagement with the neck. As will be apparent from a comparison of FIGS. 13 and 14, the element 143 automatically swings from its position of FIG. 13 to its normal position of FIG. 14 upon the downward movement of neck 129 in a manner freeing the cap to fall downwardly to its FIG. 14 position out of the way of element 143. After the cap has been completely applied to the FIG. 17 condition, the operator moves the filled and capped bag forwardly out of engagement with the throats of the two holders 30 and 137, and then places another bag and loosely carried cap in the FIG. 13 position in preparation for the next cycle of operation. During the final upward movement of the bag to the FIG. 17 position, the outer free end of arm 151 of element 148 is deflected slightly upwardly by bag flange 130 (and about pivotal axis 150) as between the full line and broken line positions of FIG. 15.

When the member 126 and its carried parts moves upwardly in its right hand position, the angle member 197 of FIG. 18 acts through element 196 to actuate switch 198, assuming that a bag is present in the left hand holder 31 of the apparatus, and has thus deflected the left hand drip tray to a position aligning element 196 for such operation. This opening of air switch 198 applies a pneumatic signal through line 214 to valve 209, to thus admit air to the right hand liquid inlet valve 21, and the left hand liquid discharge valve 24, so that the main piston within cylinder 18 moves leftwardly under the influence of the pressure of the fluid admitted through valve 21, to fill a metered quantity of liquid into the left hand bag. Thus, the apparatus functions to repeatedly fill bags at the two filling locations as rapidly as an operator can remove the filled bags and replace them with unfilled ones.

As indicated above, the pressure of the milk or other liquid entering one side of the cylinder 18 acts to force the liquid from the other side upon each filling operation. Further, the apparatus automatically responds to an excessive increase in the pressure of the liquid supplied through line 20, to halt the operation of the apparatus until this excessive pressure is no longer encountered. This result is attained by adjusting regulator 211 and preselecting the force of the return springs within liquid inlet valves 21 and 22 to prevent opening of those valves if excessive liquid pressure is encountered. For example, the regulator 211 may be so adjusted as to supply air to valves 21 and 22 at a pressure of say 50 pounds per square inch, and to be incapable of opening valves 21 and 22 if the pressure of the liquid being dispensed (which liquid pressure acts against the air pressure in tending to close valves 21 and 22) reaches a value in excess of about 30 pounds per square inch.

In apparatus handling milk, as well as various other liquids, it is extremely important that the equipment be designed for very easy and thorough cleaning. For this reason, the present machine is so designed that its liquid handling parts and passages can be completely rinsed out regularly with water or a cleansing solution, and so that these parts can also be disassembled very rapidly for an even more thorough cleansing. In this connection, FIGS. 1a, 1b and 1c show at 154 a special discharge conduit which may be connected to the two liquid outlet spouts 25 and 26 of valve units 23 and 24, so that rinse water under pressure may be introduced into the inlet line 20, and be discharged from valve units 23 and 24 through fitting 154 to an appropriate discharge location. Tubular fitting 154 has a horizontally extending poriton 300 whose first end 301 is connected to a hose or other line 401 leading to a disposal location, and whose second end 302 is turned upwardly and is adapted to fit into the notch 353 of FIG. 8 in holder 30, in fluid tight annular engagement with spout 25 of valve 23. Similarly, a tubular branch 304 protects upwardly into annular sealed engagement with spout 26 of valve unit 24, and is received within and located by throat 155 of holder 31. With the parts in this condition, the apparatus is cycled a number of times to admit the rinse water into opposite ends of the cylinder, reciprocate the piston several times, and discharge the rinse water through valve units 23 and 24 in the same manner in which milk or other fluid is normally delivered. To assure an effective seal with the two spouts 25 and 26, the two portions 302 and 304 of fitting 154 may carry a pair of tubular necks 303 and 305, which may be constructed the same as necks 129 of bags 14, to be retained and located by the holders in same manner as are the bag necks during filling.

When it is desired to completely disassemble the equipment, a user may loosen or remove wing nuts 111 and 115 of FIG. 1, to enable detachment of the connected rods 109 and 114 from members 105 and 112 respectively, to thus free the cylinder 18 for removal forwardly from its position of FIG. 1. Prior to such removal of the cylinder, valves 21 and 22 may be disconnected from their inlet lines 91, and valves 21, 22, 23 and 24 may all be disconnected from end walls 37 and 38 by merely rotating these valves far enough to move their notches 59 and 96 (FIG. 3) into alignment with the heads of pins 58 and 95. The clamp 84 of FIGS. 5 and 6, and the corresponding clamps of the other three valve units, may all be disconnected to enable detachment of the pneumatic piston and cylinder mechanisms from the valve bodies such as body 52 of FIG. 5. Thus, the valve elements 63 and seal elements 66 are freed for removal from valve bodies 52, so that all of these parts may be washed separately, and similarly the end walls 37 and 38 of the cylinder may be easily removed from cylinder wall 34, and the main piston 19 and its connected parts may also be removed from the cylinder. All these parts may thus be cleaned thoroughly and then replaced in the illustrated condition in preparation for the next use of the machine.

If desired, the apparatus may be designed to enable adjustment of the volume of milk or other fluid which is delivered into each of the bags. This adjustment may be attained very simply by merely designing one or both of the enlargements 48 and 49 on the main piston rod 46 (FIG. 2) as sleeves which are shiftable to different positions along the shaft and are retainable in any set position by set screws 349 or the like. The positioning of enlargements 48 and 49 then determines the length of the stroke of piston 19, and thus varies the amount of milk delivered on each stroke.

FIG. 19 represents a variational type of cap holder 137a which may be substituted for the two holders 137 (FIGS. 3, 5 and 6), to enable use of the machine with a different type of cap or closure element 133a, in place of the closure 133 of the preceding figures. This cap 133a of FIG. 19 may have a portion 134a adapted to project downwardly into the neck 129 of a bag of the previously discussed type, and may also carry a flexible tube 230 through which the milk or other contents of the bag are ultimately to be dispensed from the bag.

For engaging and holding cap 133a, holder 137a has a horizontally extending essentially U-shaped portion 231, which may be formed of sheet metal or the like, and which contains a forwardly facing notch or throat 232 dimensioned to receive tube 230, with the remainder of the cap 133a being located directly beneath portion 231 of holder 137a. Tube 230 is a sufficiently tight fit within throat 232 to effectively frictionally retain the tube and its attached cap 133a in the broken line position of FIG. 19, so that the cap is directly above the neck of a bag, when the bag is in the positions of FIGS. 13, 14 and 15. Portion 231 of holder 137a may be rigidly carried by a second portion 233 of that holder, which in turn is attached to a laterally projecting portion 234 of the holder which is slidably received in dovetail relation within the holder 138 of FIGS. 3 and 5. A thumb screw 235 is provided for releaseably locking holder 137a in an active position of retention by bracket 138, with a similar thumb screw also typically being provided in conjunction with the alternate holder 137 of FIG. 3 and the other earlier figures.

When the caps of the type shown at 133a in FIG. 19 are being applied to a series of bags by the apparatus, by means of a pair of the holders 137a connected to opposite sides of the apparatus in place of the earlier discussed holders 137, the caps 133a are not normally supplied to the apparatus already connected to the bags, as in the case of the caps 133 of FIG. 13, but rather caps 133a may be assumed to initially be separated from the bags, and to be manually positioned in holders 137a in the broken line position of FIG. 19. Each time that a closed bag is removed from holder 30, a next successive empty bag is then slipped rearwardly into throat 128 of FIGS. 6 and 8, to engage element 148 of FIG. 13 in a manner starting a cycle of operation of the apparatus. The operator may then insert one of the caps 133a to the broken line position of FIG. 15 so that after the bag has been filled and the bag neck is returned laterally to a position beneath cap 133a, and is then actuated upwardly to the position of FIG. 17, this upward movement of the neck forces it upwardly relative to the cap 133a and to a position in which the bag is closed by the cap. During this closing action, upward movement of the cap 133a itself is prevented by engagement of the main portion of the cap with the underside of portion 231 of holder 137a of FIG. 19. Thus, application of the cap to the bag is completed in a manner very similar to that discussed in connection with the first type of cap 133.

I claim:

1. Apparatus for filling liquid into a container having a filling neck, comprising a liquid delivery fitting through which liquid may flow into said neck, and a holder adapted to engage and hold said neck and mounted for movement with a retained container neck between a filling position in which the neck receives liquid from said delivery fitting and a retracted position away from said fitting.

2. Apparatus for filling liquid into a container comprising a holder section for holding said container during filling, a delivery fitting section through which liquid is filled into said container, means for shifting one of said sections relative to the other between a first relative position in which the container may be moved into retained engagement with the holder section and a second relative position in which said container is held by the holder section at a location to be filled, and automatic control means operable by movement of said container into retained relation with said holder section to cause said shifting means to move said one section from said first relative position to said second relative position.

3. Apparatus as recited in claim 2, in which said container has a closure element, said apparatus including a second holder section positioned to receive and hold said closure element and relative to which said first holder section is movable to relatively shift the container, said control means including a control element positioned to be engaged and actuated by said closure element upon movement thereof into retained relation with respect to said second holder section.

4. Apparatus as recited in claim 1, including a second holder for holding a container closure element at a location to apply said closure element to said neck when the latter is in said retracted position, said second holder having a portion beneath which said closure element is received and which acts as a backing element resisting upward movement of the closure element as the latter is connected to the container, said portion of the second holder containing a notch for receiving and gripping a tube projecting upwardly from the closure element.

5. Apparatus for filling liquid into a container having a filling neck and having a closure element for closing said neck and initially carried by said neck, comprising a first holder adapted to engage and hold said container, a second holder for engaging and holding said closure element, said two holders being so positioned and constructed that, when they are in a predetermined first relative position, a container and a closure element carried by the container may be moved together into retained engagement with said two holders respectively, one of said holders being then movable relative to the other to a second relative position to separate said closure element and container and open the latter, means for then filling liquid into said container when said holders are in said second relative position, means for actuating said one holder to said second relative position and then back to said first relative position in a manner reconnecting said closure element to said neck, and a closure applying element mounted for swinging movement relative to said second holder and adapted to be deflected to a retracted position by movement of the closure element into engagement with the second holder, said closure element being shiftable slightly downwardly within said second holder upon said separation of the closure element and container and to a position enabling swinging movement of said closure applying element to an active position in which it acts as a backing element for the closure element forcing it into tight engagement with said neck when said one holder returns to said first relative position.

6. Apparatus for filling liquid into containers, comprising a hollow body for receiving said liquid, a partition dividing the interior of said body into two variable size compartments at opposite sides thereof, said partition being movable relative to said body in two opposite directions to relatively inversely vary the sizes of said compartments, means for holding two containers to be filled at two different filling locations, two delivery fittings for discharging liquid alternatively from said two compartments respectively into said two containers respectively and upon relative movement of said partition in said two directions respectively, inlets for admitting liquid into said two compartments alternately and into each compartment while liquid is discharging from the other compartment, said holding means including two holders for holding said two containers respectively and shiftable between active filling positions and retracted positions, means for actuating said holders simultaneously but reversely so that as one moves to its filling position the other moves to its retracted position and vice versa, second holders for receiving and holding closure elements for said containers upon movement of said containers into retained relation with said first holders, said first holders being movable relative to said second holders to said active positions, control elements responsive to movement of a closure element into retained relation with respect to an associated one of said second holders to commence movement of an associated first holder to its active position, valve means in said inlets and said delivery fittings responsive to arrival of each of said first holders at its active position to commence the delivery of liquid thereto, a drip receptacle deflectible by said containers upon movement thereof with said first holders to said active positions and operable upon deflection to condition said valves for delivery of said liquid, and means actuable by said partition to automatically cease delivery of said liquid when the partition reaches predetermined end positions, said means for actuating said holders including a first member which is power actuable in two opposite horizontal directions, a second member carrying said first holders and movable horizontally in said opposite directions by said first member, and cam means on said first and second members for shifting said second member downwardly at the commencement of each horizontal movement and upwardly at the termination of that movement.

7. Apparatus for filling liquid into a container having a filling neck, comprising a liquid delivery fitting through which liquid may flow into said neck, a holder adapted to engage and hold said neck and mounted for movement with a retained container neck between a filling position in which the neck receives liquid from said delivery fitting and a retracted position away from said fitting, and means for applying a container closure element to said neck when the latter is in said retracted position.

8. Apparatus as recited in claim 7, including power driven means for actuating said holder between said positions.

9. Apparatus as recited in claim 7, in which said means include a second holder for holding said closure element at a location to apply said closure element to said neck by virtue of movement of the latter to said retracted position.

10. Apparatus as recited in claim 7, in which said means include a second holder for holding a container closure element at a location to apply said closure element to said neck when the latter is in said retracted position, said two holders being so constructed and positioned that, when the first mentioned holder is in said retracted position, a container neck and a closure element carried thereby may be moved together into retained engagement with said two holders respectively.

11. Apparatus as recited in claim 7, in which said means include a second holder for holding a container closure element at a location to apply said closure element to said neck when the latter is in said retracted position, said apparatus including means for actuating said first mentioned holder from said retracted position to said filling position and away from said second holder in a manner moving said neck to the delivery fitting for filling, and then returning said neck to said retracted position after filling for connection to said closure element.

12. Apparatus as recited in claim 11, in which said actuating means include means for shifting said first holder and neck first downwardly from said second holder and closure element, next laterally, and then upwardly to said delivery fitting for filling, and then downwardly, laterally and upwardly into engagement with said closure element, said two holders being so constructed that, when the first mentioned holder is in said retracted position, a container neck and a closure element carried thereby may be moved together into retained engagement with said two holders respectively in preparation for a filling operation.

13. Apparatus as recited in claim 7, in which said means include a second holder for holding a container closure element at a location to apply said closure element to said neck when the latter is in said retracted position, said apparatus including means for actuating said first mentioned holder from said retracted position to said filling position and away from said second holder in a manner moving said neck to the delivery fitting for filling, then returning said neck to said retracted position after filling for connection to said closure element, said actuating means including power actuated means for shifting said first holder in a first lateral direction from a position beneath said second holder to a position beneath said delivery fitting, and then shifting said first holder back in a reverse lateral direction to said position beneath the second holder, and cam means for deflecting said first holder downwardly at the commencement of its movement in each of said lateral directions and upwardly at the end of said movement in each lateral direction.

14. Apparatus as recited in claim 13, in which said power actuated means include a first member which is power driven directly horizontally in said two lateral directions, and a second member driven horizontally by said first member and operable to shift said first holder, said cam means including a generally V-shaped slot in one of said members and a cam element carried by the other member and received in said slot in a relation camming the second member downwardly and upwardly at the commencement and termination of its horizontal movement.

15. Apparatus as recited in claim 7, in which said means include a second holder for holding said closure element at a location to apply said closure element to said neck by virtue of movement of the later to said retracted position, said apparatus including means for shifting said first holder and neck first downwardly from said second holder, next laterally, and then upwardly to said delivery fitting for filling, and then downwardly, laterally and upwardly into interconnecting engagement with a closure element retained by said second holder.

16. Apparatus for filling liquid into a container having a filling neck and having a closure element for closing said neck and initially carried by said neck, comprising a first holder adapted to engage and hold said container, a second holder for engaging and holding said closure element, said two holders being so positioned and constructed that, when they are in a predetermined first relative position, a container and a closure element carried by the container may be moved together in a direction essentially transversely of said neck into retained engagement with said two holders respectively, said first holder having means interfitting in holding relation with said container upon said essentially transverse movement, said second holder having means interfitting in holding relation with said closure element upon said essentially transverse movement, one of said holders being then movable relative to the other essentially axially of said neck to a second relative position and being operable by such movement to separate said closure element and container axially and open the latter, and means for then filling liquid into said container.

17. Apparatus as recited in claim 16, including means for actuating said one holder axially to said second relative position, then transversely to a third position for filling, and then back transversely and axially to said first relative position in a manner reconnecting said closure element to said neck.

18. Apparatus for filling liquid into a container including a delivery fitting through which said liquid may be fed into a container received at a predetermined filling location, a drip receptacle beneath said fitting and mounted to be engaged by said container and be deflected thereby from an active position to a retracted position relative to said fitting upon movement of the container to said filling location, and means for controlling the delivery of liquid to said container from said fitting and operable by said drip receptacle to automatically prevent such filling unless the drip receptacle is in said retracted position.

19. Apparatus as recited in claim 18, including a holder for holding said container and movable laterally to a position beneath said fitting and then upwardly to a filling position, said delivery controlling means including a control element for conditioning said delivery fitting to feed liquid into the container, a part movable upwardly with said holder to actuate said control element, and an intermediate element operatively interposed between said part and said control element to transmit actuating force therebetween and actuable by movement of said drip receptacle between an active position for transmitting said force when the drip receptacle is in said retracted position and an inactive position in which said intermediate element does not transmit said force when the drip receptacle is in its active position.

20. Apparatus as recited in claim 18, including a holder for holding said container, means for moving said holder with a carried container to said filling location, said drip receptacle being constructed and positioned to remain in said active position thereof upon movement of said holder to said filling location without a carried container, but being deflectible to said retracted position by engagement with a container upon movement of said holder to said filling location with the container.

21. Apparatus for filling liquid into containers, comprising a hollow body for receiving said liquid, a movable wall dividing the interior of said body into two variable size chambers at opposite sides thereof, said wall being movable relative to said body in two opposite directions and between two opposite end positions to relatively inversely vary the sizes of said chambers, a first delivery fitting for discharging metered liquid from a first of said chambers into a container at a first filling location upon movement of said wall in a first of said directions and toward a first of said end positions, a second delivery fitting for discharging metered liquid from the second chamber into a container at a second filling location upon movement of said wall in a second of said directions and toward the second end position, inlets for admitting liquid into said two chambers alternately and into each chamber while liquid is discharging from the other chamber, a first holder for holding a container at said first filling location and shiftable between an active filling position and a retracted position, a second holder for holding a container at said second filling location and shiftable between an active filling position and a retracted position, means operable to shift each holder to its active filling position prior to commencement of a stroke of said movable wall in a direction to fill a container retained by that holder, and operable to shift each holder to its retracted position after completion of a stroke of said wall in a direction to fill a container retained by that holder, and means for applying closures to said filled containers in said retracted positions of the two holders.

22. Apparatus as recited in claim 21, in which said two holders are connected together for movement simultaneously but reversely so that as one moves to its filling position the other moves to its retracted position and vice versa.

23. Apparatus as recited in claim 21, in which said two holders are connected together for movement simultaneously but reversely so that as one moves to its filling position the other moves to its retracted position and vice versa, said means for shifting said holders being operable to shift them simultaneously and reversely while said movable wall is stationary at said end positions thereof.

24. Apparatus as recited in claim 21, in which said means for shifting the holders include automatic control means responsive to movement of a container into retained relation with one of said holders to commence movement of that holder to its active position.

25. Apparatus as recited in claim 21, including means automatically responsive to the arrival of one of said holders at its active position to commence movement of said movable wall in a direction to fill a container retained by that holder.

26. Apparatus as recited in claim 21, including automatic control means actuable by a container upon movement thereof by one of said holders to filling position, and means operable by said control means to condition one of said delivery fittings for delivery of fluid if a container is carried by the holder but not if the holder moves to active position without a container.

27. Apparatus as recited in claim 21, in which said closure applying means include two additional holders for retaining said closures at locations such that movement of the containers from said active positions to said retracted positions forces the closures into closing relation with the containers.

28. Apparatus as recited in claim 21, in which said means for shifting the holders include automatic control means having first and second elements responsive respectively to arrival of said movable wall at said end positions and to movement of containers into retained relation with respect to said holders, and operable to commence shifting movement of each of said holders from retracted to active position after a container is retained thereby and said movable wall reaches one of said end positions, but not before both of those conditions are satisfied.

29. Apparatus for filling fluid into containers comprising a support frame, a cylinder assembly removably supported by said frame and including a tubular side wall and two end walls disposed across opposite ends of said tubular side wall and removable therefrom to expose the interior of the cylinder assembly for cleaning, a piston in the cylinder assembly, two spaced support members connected at first ends to said frame and projecting therefrom across outer sides of said end walls to secure the end walls against detachment from said side wall, and a rod extending axially along the outer side of said tubular side wall and connected at its opposite ends to second ends of said members, said rod being detachable from at least one of said members for removal of the cylinder assembly from the frame.

30. Apparatus as recited in claim 29, including lugs on said end walls engageable with upper surfaces of said members to support the cylinder.

31. Apparatus as recited in claim 29, including a piston rod connected to and movable with said piston and projecting through apertures in said end walls and engageable with said members in a relation supporting the piston rod and cylinder assembly therefrom.

32. Apparatus as recited in claim 29, including a piston rod connected to and movable with said piston and projecting through apertures in said end walls, and fluid tight bushing structures sealing said piston rod with respect to said apertures and retained in position by said members.

33. Apparatus as recited in claim 29, in which said members project generally horizontally from said frame, there being two additional elongated members extending generally vertically along said outer sides of said end walls to secure them to the side wall, and two rods extending axially along the upper and lower sides of said tubular side wall and detachably connected at opposite ends to said additional members.

34. Apparatus as recited in claim 29, including inlet and outlet valve means carried by said end walls for controlling the flow of said fluid into and out of opposite ends of the cylinder assembly, and quick release connections securing said valve means to said end walls detachably for cleaning.

35. Apparatus as recited in claim 29, including inlet and outlet valve means carried by said end walls for controlling the flow of said fluid into and out of opposite ends of the cylinder assembly, and quick release connections securing said valve means to said end walls detachably for cleaning, pressure fluid actuated piston and cylinder mechanisms for actuating said inlet and outlet valve means, and additional quick release connections securing said mechanisms to said valve means detachably.

36. Apparatus as recited in claim 29, including a piston rod connected to and movable with said piston and projecting through apertures in said end walls, fluid tight bushing structures sealing said piston rod with respect to said apertures and retained in position by said members, lugs on said end walls engageable with said members to support the cylinder assembly, inlet and outlet valve means, quick release connections attaching said valve means detachably to said end walls, piston and cylinder mechanisms for actuating said valve means, additional quick release connections securing said mechanisms detachably to said valve means, said members projecting generally horizontally from said frame, two additional elongated members extending generally vertically along said outer sides of said end walls to secure them to the side wall, and two rods extending axially along the upper and lower sides of said tubular side wall and detachably connected at opposite ends to said additional members.

37. Apparatus for filling liquid into containers, comprising a hollow body for receiving said liquid and having two opposite end walls, a movable wall dividing the interior of said body into two variable size chambers at opposite sides thereof, said wall being movable relative to said body in two opposite directions and between two opposite end positions to relatively inversely vary the sizes of said chambers, a first delivery fitting for discharging metered liquid from a first of said chambers into a container at a first filling location upon movement of said wall in a first of said directions and toward a first of said end positions, a second delivery fitting for discharging metered liquid from the second chamber into a container at a second filling location upon movement of said wall in a second of said directions and toward the second end position, inlets for admitting liquid into said two chambers alternately and into each chamber while liquid is discharging from the other chamber, valve means controlling the flow of liquid to and from said chambers, a rod projecting from and movable with said movable wall and extending axially through an aperture in at least one of said end walls, and automatic control means actuated by said rod at the outside of said body and controlling said valve means in a relation determining the length of stroke of said movable wall and therefore the quantity of dispensed liquid.

38. Apparatus as recited in claim 37, including means carried by said rod for actuating said valve means and constructed to adjust said length of stroke of the movable wall to thereby adjust the quantity of dispensed liquid.

39. Apparatus for filling a fluid into a series of containers including two spaced discharge outlets for delivering fluid into said containers, means for feeding fluid to said outlets alternately and operable during rinsing to deliver rinse water alternately to said outlets, a conduit fitting having two branches connectible to said outlets respectively and operable to receive said rinse water therefrom and deliver it to a predetermined location, holders for receiving and holding necks of said containers during filling, and means on said conduit fitting connectible to said holders to hold the fitting in communication with said outlets during rinsing.

40. Apparatus as recited in claim 39, in which one of said holders contains a retaining throat which receives and retains a container in filling condition and one of said branches of the conduit fitting in rinsing condition, the other holder containing a first throat for receiving and retaining a container in filling condition and a second and different throat for receiving and retaining a branch of the conduit fitting in rinsing condition.

41. Container filling apparatus comprising means for filling metered quantities of a liquid into a series of containers and alternately at two different filling locations, two holders for holding containers at said two filling locations, respectively, first automatic control means responsive to completion of the filling of said metered quantity of liquid into a particular container at one of said locations, second automatic control means responsive to movement of a container to be filled into retained relation with respect to either of said holders, and means responsive to both of said control means and operable to prevent commencement of a filling operation at one of said filling locations until a prior filling operation has been completed at the other filling location, as sensed by said first control means, and also a container has been moved into retained relation with said holder at said one filling location, as sensed by said second control means.

(References on following page)

References Cited

UNITED STATES PATENTS

| | | | |
|---|---|---|---|
| 384,766 | 6/1888 | Kendall | 222—249 |
| 2,017,766 | 10/1935 | Mullen | 53—109 X |
| 2,352,761 | 7/1944 | Bell | 53—109 |
| 2,944,573 | 7/1960 | Weideman et al. | 141—87 |
| 3,152,607 | 10/1964 | Lundeen | 137—505.13 |
| 3,251,376 | 5/1966 | Worden | 137—505.18 |
| 3,299,606 | 1/1967 | Weikert | 53—37 |

FOREIGN PATENTS 807.338  1/1959  Great Britain.

HOUSTON S. BELL, Jr., *Primary Examiner.*

U.S. Cl. X.R.

53—281, 381; 137—505.13; 141—87, 90, 168, 372; 222—250